June 10, 1947. J. A. MULLER 2,422,119
CONTROL VALVE
Filed Aug. 26, 1943
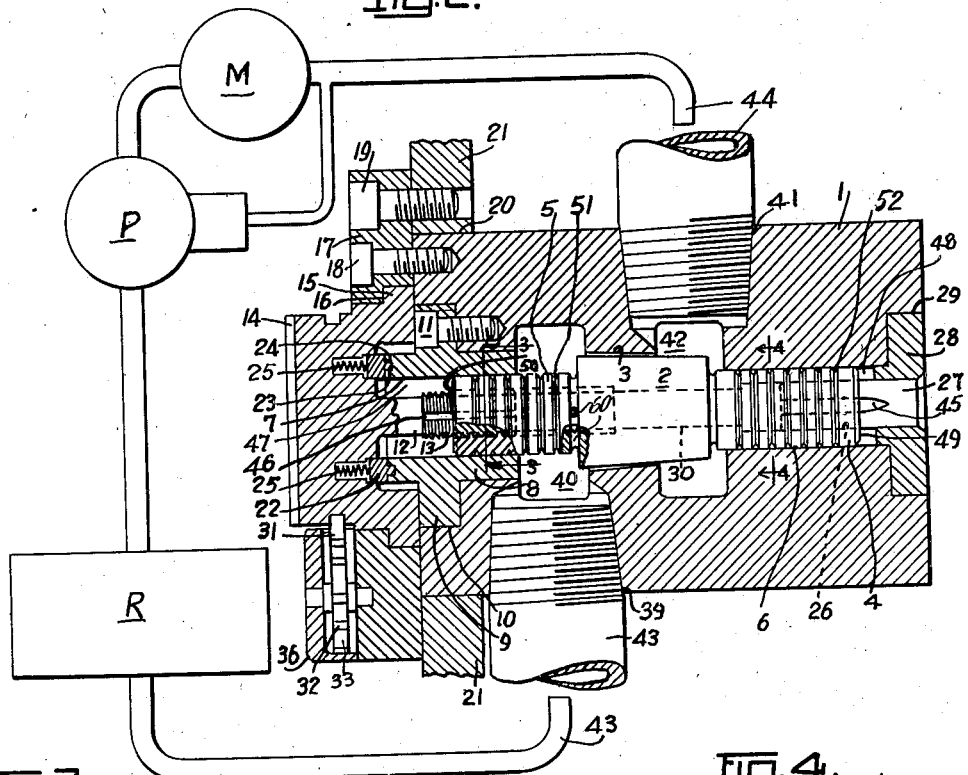
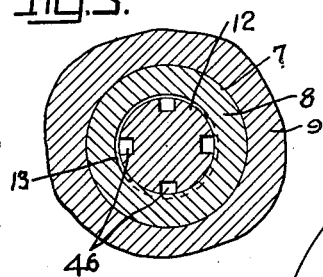
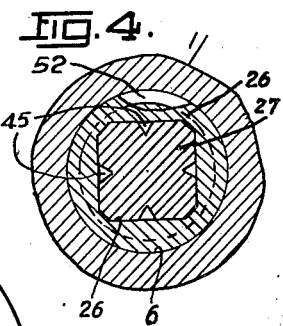
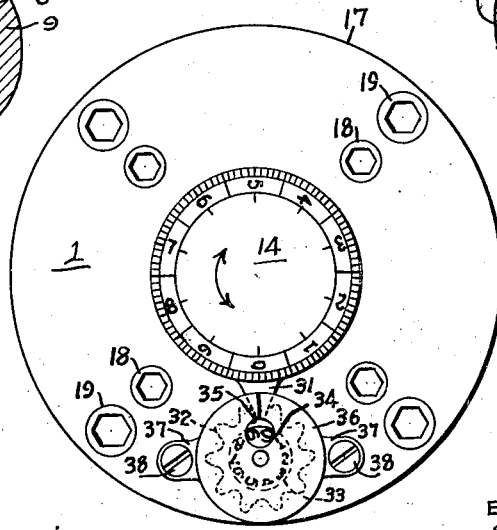
INVENTOR
JOHAN A. MULLER,
BY
ATTORNEYS Patented June 10, 1947

2,422,119

UNITED STATES PATENT OFFICE 2,422,119

CONTROL VALVE

Johan A. Muller, Dayton, Ohio, assignor to H-P-M Development Corporation, a corporation of Delaware Application August 26, 1943, Serial No. 500,069

3 Claims. (Cl. 251—34)

This invention relates to a valve, having special application to hydraulic machinery including one or more hydraulic motors, although it is not limited to such structure.

An object of the invention is to provide a compact control valve unit which may be installed as a unit in the bored hole or orifice of a panel block when used as a part of a control system for one or more hydraulic motors.

It is another object of this invention to provide a valve with a sealed-in pressure level.

Another object of this invention is the provision of a valve of the type described having means for indicating the setting of the valve.

Still another object is to provide a valve including a tapered plug in a tapered hole with means to obtain a very accurate control in the space between the tapered valve plug and the tapered hole in the valve body so that a predetermined volume flow of fluid through the valve can always be obtained with a predetermined setting of the valve.

A further object of the invention is to obtain the foregoing objects by providing accurately ground guide members that are freely reciprocable, whereby it will always be possible to preset the valve plug and thus to obtain a predetermined flow of hydraulic fluid therethrough.

An additional object of the invention is to provide a valve for controlling accurately the flow of hydraulic fluid through a valve, the valve having an indicating device on the exterior thereof which will accurately indicate the volume flow through the valve.

Another object is to provide a valve of the type stated in the preceding paragraph wherein the indicating means is provided with indicia which indicates the speed of operation of a hydraulic motor.

Other objects are indicated throughout the specification.

In the drawings:

Figure 1 is an end elevational view of the valve showing the adjusting knob and indicating mechanism;

Figure 2 is a vertical longitudinal sectional view through the valve and casing, and showing in perspective a hydraulic system connected thereto;

Figure 3 is a section of the interior of the valve taken on the line 3—3 of Figure 2, and Figure 4 is another section of the valve taken on the line 4—4 of Figure 2.

In general, this invention is directed to a valve which may be installed as a unit in a bored hole of a panel block. The valve has particular application when used with and as a part of a control system for one or more hydraulic motors using a single pressure source.

Referring now to the drawings in detail, the valve shown therein comprises a valve body indicated by the numeral 1, and a tapered plug indicated at 2. The valve body is provided with a tapered seat 3 which cooperates with the tapered plug 2 to give the desired throttling action.

The tapered plug has guide members or extensions 4 and 5 which are cylindrical and which fit within a cylindrical bore 6 of the valve, and a cylindrical bore 7 of a sleeve member 8. The sleeve 8 may be held rigidly in position by means of a shoulder 9 which fits within a recess 10 of the valve body by means of screws 11. The extensions 4 and 5 serve to guide the plug 2 accurately to its seat 3, whereby it is guided along the center line of the valve body.

Motion is imparted to the tapered plug by means of the threaded spindle 12 which engages internal threads 13 in the extension 5. The spindle 12 is turned by means of a knob or graduated hand wheel 14. Said hand wheel is retained on the valve body by means of a collar 15 secured to the wheel which fits within a recess 16 of a retaining plate 17. Means such as screws 18 serve to retain the hand wheel and other parts in position on the valve body. Other securing means such as screws 19 serve to retain the aforementioned parts as a unit in position within an aperture 20 of the panel 21.

Slippage at the left hand end of the valve is prevented from leaking to the exterior by means of a ring 22, preferably made of carbon, and said ring is provided with a circular collar 23 which fits within a circular recess 24 in the left hand end of the sleeve member, the ring being forced to the right so as to make a tight contact by a plurality of springs 25.

The extension 4 is provided with a hollow squared interior 26 which is adapted to receive a squared shaft 27 which is fixed to the collar 28, which latter may be of square configuration and fit within a squared recess 29 within the right hand end of the valve body as viewed in Figure 2. The squared shaft 27 by reason of the fact that it fits within the squared interior 26, prevents rotation of the tapered plug 2, when adjustment of the valve setting is made by means of the hand wheel 14.

The tapered plug 2 is provided with a bore 30, and this bore connects the squared interior 26 in the extension 4 with the recess defined by the internal threads 13 in the extension 5. The tapered plug bore which thus connects these recesses allows draining of the slippage.

The graduated hand wheel 14 is provided with a radially extending tooth 31 which is adapted to engage a plurality of similar teeth 32 on a dial 33. The dial 33 is graduated as shown at 34, which graduations become visible through a hole 35 in the cover 36, as the dial 33 is indexed. Preferably, the graduations on the hand wheel 14 are from zero to 9.9. For each revolution of the hand wheel 14 the dial 33 is indexed one-tenth revolution. Consequently, the setting of the valve may be indicated to three figures.

As will be seen from an inspection of Figure 1, the cover 36 is held in position on the retaining plate 17 by means of ears 37 integral with said cover, having apertures (not shown) by means of which it is held in position by screws 38.

The valve casing 1 is provided with a screw-threaded aperture 39 which leads into the chamber 40, and a screw-threaded aperture 41 which leads to the chamber 42. A pipe 43, as shown in Figure 2, is in screw engagement with the aperture 39 and a pipe 44 is in screw-threaded engagement with the aperture 41. The pipe 43 may be considered as a drainage pipe and as such it connects to the tank or reservoir R, and pipe 44 connects to a variable delivery pump P, and to a hydraulic motor M, by the connections indicated in Figure 2.

Squared shaft 27 is further provided with a plurality of passageways 45 as shown in Figure 4, and the threaded spindle 12 is provided with passageways 46 as seen in Figures 2 and 3. The purpose of the passageways or grooves 45 and 46 is to maintain the chambers 47 and 48 at the opposite ends of the guide members or extensions 4 and 5, in communication with the exhaust side of the hydraulic system of which the valve forms a part by way of passages 60, Figure 2, in order that there will be no pressure built up in these chambers because of slippage of high pressure fluid past the extensions 4 and 5. These drainage passageways 45 and 46 are essential because it is thereby made impossible for liquid pressure to build up in either of the chambers or spaces 47 and 48. Thus no fluid finds its way past this seal and to the exterior portions of the hand wheel 14 and the dial 33. Thus pressure in the chamber 47 is substantially the same as in exhaust chamber 40. The same is true of pressure within the chamber 48 and there exists no tendency for liquid in this chamber to find its way to the outside of the valve by way of the contacting surfaces of the squared recess 29 and collar 28, or between the contacting surfaces of the squared shaft 27 and the collar 28. Any liquid within either of these chambers finds its way through passages 45 and 46 to the chamber 40 which leads directly to the exhaust pipe 43, the whole being connected to the reservoir. The carbon seal ring 22 provides an effective seal against the low pressure within the chamber 47. It will also be appreciated that the hand wheel 14 must be so mounted as to be freely rotatable when actuated, and for this reason it would not be possible to provide tight packing fittings to prevent leakage of fluid to the hand wheel. The provision of the passageways 45 and 46 for draining fluid into the exhaust pipe 43 therefore makes it possible to do away with such tight packing fittings.

The extensions 4 and 5 are each provided with a plurality of circular grooves 52 and 51, respectively. These grooves accomplish two purposes, i. e., they provide a radial hydraulic balancing on the extensions or guide members, whereby said guide members tend to float on a film of fluid such as oil, and it will be noted that the guide members or extensions are co-axial with each other in the cylindrical bores 6 and 7. These grooves further provide a gradually decreasing pressure toward the outside ends of the guide members, i. e., toward the chambers 48 and 47, whereby to reduce slippage of pressure fluid past the guide members.

It will be understood from the foregoing description that the present invention includes a valve which is constructed whereby very accurate control may be maintained in the space between the tapered valve plug and the tapered hole in the valve body, whereby a predetermined volume flow of fluid through the valve can always be obtained through a predetermined hand setting of the valve.

This result is obtained in large part because the valve plug is guided at both ends by accurately ground guide members that are freely reciprocable. It is thus always possible to pre-set the valve plug and to thereby obtain a predetermined flow of hydraulic fluid therethrough.

It becomes very important to obtain accurate control, i. e., a predetermined volume flow of fluid through the valve upon a predetermined setting of the same, in hydraulic control systems wherein a motor is hydraulically driven, such as shown in Figure 2. It will be apparent that in order to obtain accurate control of the speed of this hydraulic motor that it is necessary to accurately control the volume through the motor and it will be apparent that the construction described above accomplishes this purpose.

It will be understood that the invention is not limited to the particular construction shown in the drawings, but also embraces such modifications as come within the scope of the appended claims.

What is claimed is:

1. The combination in a valve, of a valve body, a flow passage through said valve body comprising a relatively long tapered valve seat, a relatively long tapered valve member adapted with said seat to form a variable orifice, projections integral with said valve member extending axially either way therefrom for engagement with said valve body whereby said valve member is rigidly guided toward and from said seat, one of said extensions having a threaded recess therein, a hand wheel having a threaded portion adapted for engagement with said threaded recess, a plate adapted for rotatably securing said hand wheel to said body, and sealing means comprising a spring pressed annular ring carried by one of said hand wheels and body and in engagement with the other thereof for preventing leakage of fluid from said body.

2. The combination in a valve, of a valve body, a flow passage through said valve body comprising a relatively long tapered valve seat, cylindrical bores in opposite ends of said valve body having their axes parallel with the axis of said tapered seat, a valve member comprising cylindrical end portions received in said bores and a relatively long tapered central portion adapted for forming with said seat an adjustable orifice, one of said extensions having a key way therein, a key affixed to said body and in engagement with said key-way for preventing rotation of said valve member, the other of said extensions having a threaded bore therein, a hand wheel externally of said body having a threaded extension thereon in engagement with said threaded recess, said hand wheel comprising an annular flange, and a plate secured to said body having an annular recess therein adapted rotatably to secure said hand wheel to said body.

3. The combination in a valve, of a valve body having a low pressure chamber and a high pressure chamber interconnected by a tapering valve seat, cylindrical recesses in each end of said valve body in axial alignment with the axis of said seat, a tapering valve member in said valve body having cylindrical extensions extending into said cylindrical recesses, the extension on the high pressure end of said valve being shaped for receiving a key, a key rigidly secured to said valve body and extending into said extension whereby rotation of said valve member is prevented, the extension on the low pressure end of said valve body being internally threaded, a hand wheel rotatably secured to the low pressure end of said valve body and having a threaded projection thereon engaging the said threaded extension, sealing means comprising a spring pressed annular ring between said hand wheel and body urged against one thereof, and means continuously exhausting said cylindrical recesses comprising passage means extending from said recesses through said valve member and into said low pressure chamber.

JOHAN A. MULLER.

REFERENCES CITED

The following references are of record in the file of this patent:

UNITED STATES PATENTS

| Number | Name | Date |
| --- | --- | --- |
| 928,095 | Alderfer | July 13, 1909 |
| 639,673 | Dyblie | Dec. 19, 1899 |
| 795,715 | Lofton | July 25, 1905 |
| 1,914,028 | Knutzen | June 13, 1933 |
| 1,540,962 | Stuart | June 9, 1925 |
| 956,253 | Wood | Apr. 26, 1910 |
| 467,796 | Ferrell | Jan. 26, 1892 |
| 468,242 | Ferrell | Feb. 2, 1892 |
| 21,276 | Holland | Aug. 24, 1858 |
| 1,294,151 | Page | Feb. 11, 1919 |
| 2,331,109 | DeGanahl | Oct. 5, 1943 |
| 2,334,031 | Rappl | Nov. 9, 1943 |
| 1,726,211 | Bridgens | Aug. 27, 1929 |
| 1,851,075 | Ackerman | Mar. 29, 1932 |